United States Patent
DeVilbiss

(10) Patent No.: US 7,317,303 B1
(45) Date of Patent: Jan. 8, 2008

(54) RECTIFIED POWER SUPPLY

(75) Inventor: Alan D. DeVilbiss, Colorado Springs, CO (US)

(73) Assignee: Celis Semiconductor Corp., Colorado Springs, CO (US)

( * ) Notice: Subject to any disclaimer, the term of this patent is extended or adjusted under 35 U.S.C. 154(b) by 0 days.

(21) Appl. No.: 11/564,954

(22) Filed: Nov. 30, 2006

(51) Int. Cl.
*G05F 3/08* (2006.01)
*H02M 7/02* (2006.01)

(52) U.S. Cl. .................. 323/223; 340/10.5; 343/861; 363/125

(58) Field of Classification Search ............... 323/222, 323/223, 226, 273, 282, 349, 351, 352; 340/10.1, 340/10.2, 10.5; 343/850, 860, 861; 363/89, 363/125
See application file for complete search history.

(56) References Cited

U.S. PATENT DOCUMENTS

| | | | |
|---|---|---|---|
| 6,515,919 B1 * | 2/2003 | Lee | 365/192 |
| 6,664,770 B1 * | 12/2003 | Bartels | 323/222 |
| 6,940,467 B2 * | 9/2005 | Fischer et al. | 343/850 |
| 7,218,204 B2 * | 5/2007 | Hayashi | 340/10.34 |

\* cited by examiner

*Primary Examiner*—Gary L Laxton
(74) *Attorney, Agent, or Firm*—Mark G. Pannell; Hanes & Schutz, LLC

(57) ABSTRACT

A power supply creates a voltage difference between high and low power supply rails. The power supply has a voltage signal source, a capacitive coupling element, energy storage element 12, first and second rectifying diodes, a regulator, and bypass means for selectively decreasing the impedance between the voltage signal source and the low power supply rail or increasing the load presented to the voltage signal source. The capacitive coupling element is connected to the voltage signal source. Energy storage element 12 stores energy between the high and low power supply rails. The first rectifying diode is positioned between the capacitive coupling element and energy storage element 12. It is coupled to the voltage signal source through the capacitive coupling element and arranged to favor current flow toward energy storage element 12 from the capacitive coupling element. The second rectifying diode is positioned between the capacitive coupling element and the low power supply rail. It is coupled to the voltage signal source through the capacitive coupling element and arranged to favor current flow toward the capacitive coupling element from the low power supply rail. The regulator regulates the level of energy stored in energy storage element 12.

30 Claims, 1 Drawing Sheet

RECTIFIED POWER SUPPLY

BACKGROUND OF THE INVENTION

Radio frequency identification (RFID) chips typically include circuitry that rectifies a carrier wave to generate a regulated power supply for the chip. The carrier wave is generated by an RFID chip reader. The RFID chips additionally include an inductor coil antenna in parallel with a tuning capacitor, creating an antenna circuit tuned to the carrier frequency.

Uplink communication between an RFID chip and an RFID card reader is accomplished through backscatter modulation by periodically increasing the load on the tuned antenna circuit. In order to maximize the signal strength of the uplink communication, it is desirable to present the largest load to the antenna.

DETAILED DESCRIPTION OF THE INVENTION

Figure 1:
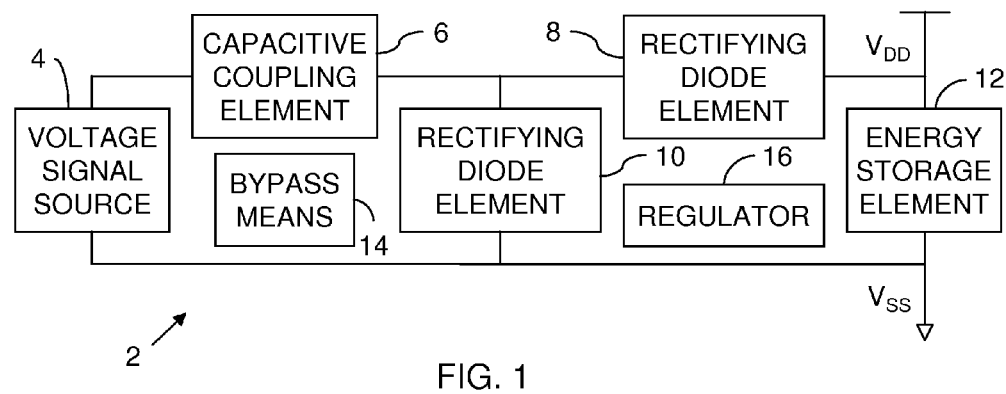
FIG. 1 is block diagram representing the present invention rectified power supply.

FIG. 1 is a block diagram illustrating an embodiment of a rectified power supply 2. In this embodiment, power supply 2 includes voltage signal source 4, capacitive coupling element 6, rectifying diodes 8, 10, energy storage element 12, bypass means 14, and regulator 16 between high power supply rail $V_{DD}$ and low power supply rail $V_{SS}$.

Rectified power supply 2 creates a voltage difference between high $V_{DD}$ and low $V_{SS}$ power supply rails, suitable for use as a power supply for an RFID chip (not shown). Voltage signal source 4 provides a radio frequency (RF) signal to coupling capacitive element 6. In one embodiment, this RF signal is induced in voltage signal source 4 by an RFID chip reader (not shown).

Coupling capacitive element 6 causes a direct current (dc) voltage offset in the RF signal. Rectifying diodes 8,10 rectify the signal from coupling capacitive element 6. Energy storage element 12 stores the energy between the high $V_{DD}$ and low $V_{SS}$ power supply rails. Regulator 16 regulates the level of energy stored in energy storage element 12. Bypass means 14, responsive to regulator 16, selectively decreases the impedance between voltage signal source 4 and low power supply rail $V_{SS}$, increasing the load presented to voltage signal source 4.

Figure 2:
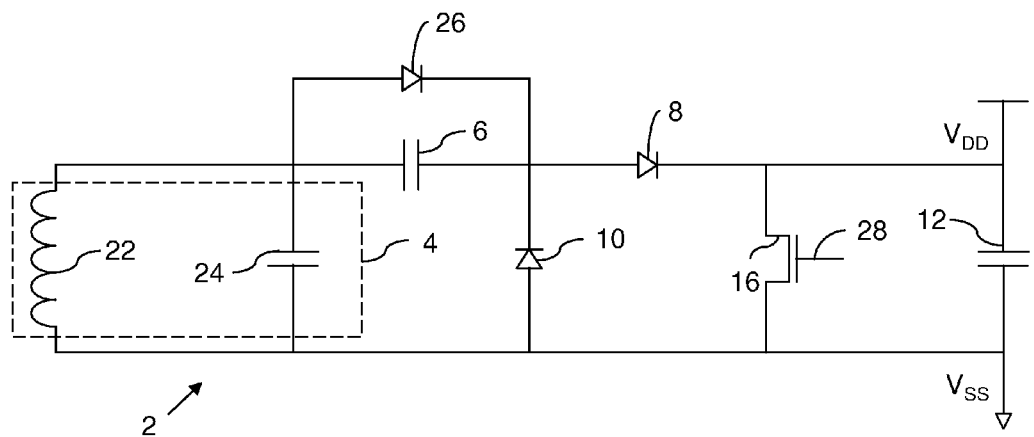
FIG. 2 is circuit diagram of one embodiment of the present invention rectified power supply.

FIG. 2 is a circuit diagram illustrating one embodiment of rectified power supply 2. In this embodiment, bypass means 14 includes a bypass diode element 26 in parallel with capacitive coupling element 6. Diode element 26 is arranged to favor current flow toward the first 8 and second 10 rectifying diodes from voltage signal source 4.

In one embodiment, voltage signal source 4 includes inductor coil antenna 22 and tuning capacitive element 24 in parallel with antenna 22. The capacitance of tuning capacitive element 24 is selected so that voltage signal source 4 is tuned to the frequency of a carrier signal from an RFID chip reader.

Capacitive coupling element 6 is connected to voltage signal source 4. Capacitive coupling element 6 couples the radio frequency signal of the carrier signal to the rectifying diodes 8,10.

Rectifying diode 8 is positioned between capacitive coupling element 6 and energy storage element 12. Rectifying diode 8 is coupled to voltage signal source 4 through capacitive coupling element 6. Rectifying diode 8 is arranged to favor current flow toward energy storage element 12 from capacitive coupling element 6.

Rectifying diode 10 is positioned between capacitive coupling element 6 and low power supply rail $V_{SS}$. Rectifying diode 10 is coupled to voltage signal source 4 through capacitive coupling element 6. Rectifying diode 10 is arranged to favor current flow toward capacitive coupling element 6 from low power supply rail $V_{SS}$.

Energy storage element 12 stores energy for power supply 2. For instance, energy storage element 12 may store energy at around 1.2 volts for use by an integrated circuit such as a radio frequency identification (RFID) circuit. In one embodiment, energy storage element 12 includes a capacitive element.

Regulator 16 regulates the level of energy stored in energy storage element 12. In one embodiment, regulator 16 is a shunt regulator arranged in parallel with energy storage element 12. In one embodiment, this shut regulator is a metal oxide semiconductor field effect transistor (MOSFET) having a gate 28. Gate 28 is controlled so that when the supply voltage from capacitive coupling element 6 is too high, gate 28 is driven high, turning on MOSFET 16 so that current flows out of high power supply rail $V_{DD}$ and into low power supply rail $V_{SS}$, effectively clamping the voltage at high power supply rail $V_{DD}$.

In one embodiment, regulator 16 is also used for uplink communication with an RFID chip reader. A digital signal is applied to gate 28, turning MOSFET 16 on and off, thereby alternately increasing and decreasing the load on the antenna through capacitive coupling element 6 and rectifying diode 8.

When MOSFET 16 is off, preventing current from flowing between high power supply rail $V_{DD}$ and low power supply rail $V_{SS}$, bypass diode element 26 is reverse biased, having little effect on the operation of rectified power supply 2. When MOSFET 16 is turned on, the voltage between capacitive coupling element 6 and rectifying diode 8 is reduced and bypass diode element 26 is forward biased. In this forward biased state, current flows from the voltage signal supply through rectifying diode 8 and MOSFET 16 and into low power supply rail $V_{SS}$. The load presented to the antenna is much greater than, and the impedance much less than, it would be without bypass diode element 26.

Figure 3:
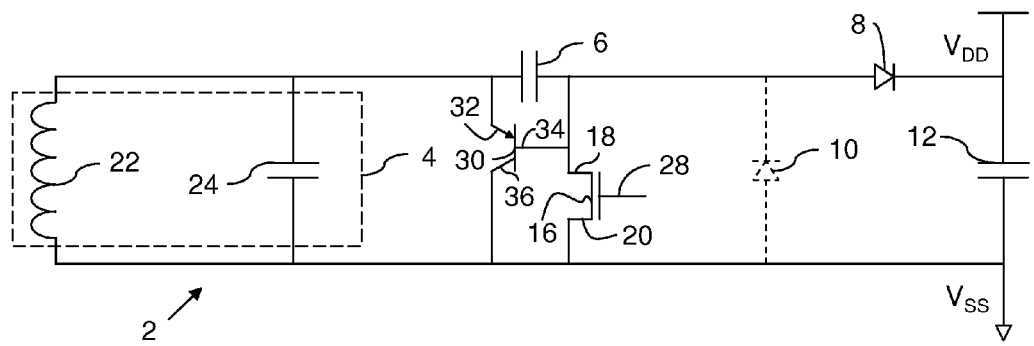
FIG. 3 is circuit diagram of an alternate embodiment of the present invention rectified power supply.

FIG. 3 is a circuit diagram illustrating one embodiment of rectified power supply 2. Elements having reference numbers like those in FIG. 2 are like those described for FIG. 2. In the embodiment of FIG. 3, bypass means 14 includes a PNP bipolar transistor 30 having an emitter 32, a base 34, and a collector 36. PNP bipolar transistor 30 is arranged with emitter 32 connected to voltage signal source 4, collector 36 connected to low power supply rail $V_{SS}$, and base 34 connected between the capacitive coupling element 6 and rectifying diode 8.

In one embodiment, regulator 16 is a shunt regulator arranged in parallel with rectifying diode 10. In one embodiment, this shut regulator is a metal oxide semiconductor field effect transistor (MOSFET) having a source 18 and a drain 20. Source 18 is connected to between the capacitive coupling element 6 and rectifying diode 8 and drain 20 is connected to low power supply rail $V_{SS}$.

When MOSFET 16 is off, the base 34-emitter 32 junction is reverse biased, having little effect on the operation of rectified power supply 2. When MOSFET 16 is turned on, the voltage between capacitive coupling element 6 and rectifying diode 8 is reduced and the base 34-emitter 32 junction is forward biased. In this forward biased state, current flows from the voltage signal supply into low power supply rail $V_{SS}$. The load presented to the antenna is much greater than, and the impedance much less than, it would be without PNP bipolar transistor 30.

Rectifying diode 10 is a directional current flow control means for favoring current flow toward capacitive coupling element 6 from low power supply rail $V_{SS}$. In one embodiment, rectifying diode 10 is omitted from the rectified power supply 2. When rectifying diode 10 is omitted, the directional current flow control means function of rectifying diode 10 is accomplished by the base 32-collector 36 junction of bipolar transistor 30. Although it may be advantageous to omit rectifying diode 10, rectifying diode 10 may be desirable in some applications, particularly if rectifying diode 10 has a lower forward drop than the base 32-collector 36 junction.

The foregoing description is only illustrative of the invention. Various alternatives, modifications, and variances can be devised by those skilled in the art without departing from the invention. Accordingly, the present invention embraces all such alternatives, modifications, and variances that fall within the scope of the described invention.

What is claimed is:

1. A power supply for creating a voltage difference between high and low power supply rails, the power supply comprising:
    a voltage signal source;
    a capacitive coupling element connected to the voltage signal source;
    an energy storage element for storing energy between the high and low power supply rails;
    first and second rectifying diodes, the first rectifying diode positioned between the capacitive coupling element and the energy storage element, coupled to the voltage signal source through the capacitive coupling element, arranged to favor current flow toward the energy storage element from the capacitive coupling element, the second rectifying diode positioned between the capacitive coupling element and the low power supply rail, coupled to the voltage signal source through the capacitive coupling element, arranged to favor current flow toward the capacitive coupling element from the low power supply rail;
    regulator means for regulating the level of energy stored in the energy storage element;
    bypass means, responsive to the regulator means, for selectively decreasing the impedance between the voltage signal source and the low power supply rail.

2. The power supply of claim 1 wherein the voltage signal source includes an antenna and a tuning capacitive element in parallel with the antenna.

3. The power supply of claim 1 wherein the regulator means includes a shunt regulator for regulating the level of energy stored in the energy storage element.

4. The power supply of claim 3 wherein the shunt regulator is in a parallel configuration with the energy storage element.

5. The power supply of claim 4 wherein the bypass means includes a third diode element in parallel with the capacitive coupling element, arranged to favor current flow toward the first and second rectifying diodes from the voltage signal source.

6. The power supply of claim 3 wherein the shunt regulator is in a parallel configuration with the second rectifying diode.

7. The power supply of claim 6 wherein the bypass means includes a PNP bipolar transistor having a base, an emitter, and a collector, the PNP bipolar transistor arranged with the emitter connected to the voltage signal source, the collector connected to the low power supply rail, and the base connected between the capacitive coupling element and the first rectifying diode.

8. A power supply circuit for creating a voltage difference between high and low power supply rails, the power supply comprising:
    a voltage signal source;
    a capacitive coupling element connected to the voltage signal source;
    an energy storage element for storing energy between the high and low power supply rails;
    first and second rectifying diodes, the first rectifying diode positioned between the capacitive coupling element and the energy storage element, coupled to the voltage signal source through the capacitive coupling element, arranged to favor current flow toward the energy storage element from the capacitive coupling element, the second rectifying diode positioned between the capacitive coupling element and the low power supply rail, coupled to the voltage signal source through the capacitive coupling element, arranged to favor current flow toward the capacitive coupling element from the low power supply rail;
    regulator means for regulating the level of energy stored in the energy storage element;
    bypass means, responsive to the regulator means, for selectively increasing the load presented to the voltage signal source.

9. The power supply of claim 8 wherein the voltage signal source includes an antenna and a tuning capacitive element in parallel with the antenna.

10. The power supply of claim 8 wherein the regulator means includes a shunt regulator for regulating the level of energy stored in the energy storage element.

11. The power supply of claim 10 wherein the shunt regulator is in a parallel configuration with the energy storage element.

12. The power supply of claim 11 wherein the bypass means includes a third diode element in parallel with the capacitive coupling element, arranged to favor current flow toward the first and second rectifying diodes from the voltage signal source.

13. The power supply of claim 10 wherein the shunt regulator is in a parallel configuration with the second rectifying diode.

14. The power supply of claim 13 wherein the bypass means includes a PNP bipolar transistor having a base, an emitter, and a collector, the PNP bipolar transistor arranged with the emitter connected to the voltage signal source, the collector connected to the low power supply rail, and the base connected between the capacitive coupling element and the first rectifying diode.

15. A power supply for creating a voltage difference between high and low power supply rails, the power supply comprising:

a voltage signal source;

a capacitive coupling element connected to the voltage signal source;

an energy storage element for storing energy between the high and low power supply rails;

a first rectifying diode positioned between the capacitive coupling element and the energy storage element, coupled to the voltage signal source through the capacitive coupling element, arranged to favor current flow toward the energy storage element from the capacitive coupling element;

a directional current flow control means for favoring current flow toward the capacitive coupling element from the low power supply rail, the directional current flow control means positioned between the capacitive coupling element and the low power supply rail;

regulator means for regulating the level of energy stored in the energy storage element;

bypass means, responsive to the regulator means, for selectively decreasing the impedance between the voltage signal source and the low power supply rail.

16. The power supply of claim 15 wherein the voltage signal source includes an antenna and a tuning capacitive element in parallel with the antenna.

17. The power supply of claim 15 wherein the regulator means includes a shunt regulator for regulating the level of energy stored in the energy storage element.

18. The power supply of claim 17 wherein the shunt regulator is in a parallel configuration with the energy storage element.

19. The power supply of claim 17 wherein the shunt regulator is in a parallel configuration with the directional current flow control means.

20. The power supply of claim 19 wherein the bypass means includes a PNP bipolar transistor having a base, an emitter, and a collector, the PNP bipolar transistor arranged with the emitter connected to the voltage signal source, the collector connected to the low power supply rail, and the base connected between the capacitive coupling element and the first rectifying diode.

21. The power supply of claim 20 wherein the directional current flow control means includes a junction between the base and the collector of the PNP bipolar transistor.

22. The power supply of claim 15 wherein the directional current flow control means includes a second rectifying diode coupled to the voltage signal source through the capacitive coupling element.

23. A power supply circuit for creating a voltage difference between high and low power supply rails, the power supply comprising:

a voltage signal source;

a capacitive coupling element connected to the voltage signal source;

an energy storage element for storing energy between the high and low power supply rails;

a rectifying diode positioned between the capacitive coupling element and the energy storage element, coupled to the voltage signal source through the capacitive coupling element, arranged to favor current flow toward the energy storage element from the capacitive coupling element;

a directional current flow control means for favoring current flow toward the capacitive coupling element from the low power supply rail, the directional current flow control means positioned between the capacitive coupling element and the low power supply rail;

regulator means for regulating the level of energy stored in the energy storage element;

bypass means, responsive to the regulator means for, selectively increasing the load presented to the voltage signal source.

24. The power supply of claim 23 wherein the voltage signal source includes an antenna and a tuning capacitive element in parallel with the antenna.

25. The power supply of claim 23 wherein the regulator means includes a shunt regulator for regulating the level of energy stored in the energy storage element.

26. The power supply of claim 25 wherein the shunt regulator is in a parallel configuration with the energy storage element.

27. The power supply of claim 25 wherein the shunt regulator is in a parallel configuration with the directional current flow control means.

28. The power supply of claim 27 wherein the bypass means includes a PNP bipolar transistor having a base, an emitter, and a collector, the PNP bipolar transistor arranged with the emitter connected to the voltage signal source, the collector connected to the low power supply rail, and the base connected between the capacitive coupling element and the first rectifying diode.

29. The power supply of claim 28 wherein the directional current flow control means includes a junction between the base and the collector of the PNP bipolar transistor.

30. The power supply of claim 23 wherein the directional current flow control means includes a second rectifying diode coupled to the voltage signal source through the capacitive coupling element.

* * * * *